United States Patent Office 3,573,108
Patented Mar. 30, 1971

3,573,108
PURIFICATION OF GERMANIUM
Robert N. Hall, Schenectady, N.Y., assignor to
General Electric Company
Filed Oct. 30, 1968, Ser. No. 772,044
Int. Cl. C22b 41/00
U.S. Cl. 148—1.6
12 Claims

ABSTRACT OF THE DISCLOSURE

Germanium having a purity of the order of $10^{12}$ uncompensated electrically active impurity atoms per cubic centimeter thereof is processed to produce hyperpure germanium having a purity, represented by the order of $10^{10}$ uncompensated impurity atoms per cubic centimeter thereof, by melting commercially available, high-purity germanium of the aforementioned impurity level in a reaction chamber wherein the molten germanium has a substantial portion of the surface thereof in contact with the ambient atmosphere and growing a crystalline ingot therefrom by fractional crystallization while pure dry nitrogen is passed through the reaction chamber.

---

The present invention relates to the processing and preparation of hyperpure germanium. More particularly, the invention relates to the preparation of germanium having uncompensated activation impurities therein of the order of $10^{10}$ per cubic centimeter thereof from germanium having a concentration of the order of $10^{12}$ uncompensated activator impurities thereof per cubic centimeter. The invention described herein was made in the course of or under a contract with the Atomic Energy Commission.

In the prior art, the processing of germanium to obtain the requisite purity thereof for semiconductor uses has progressed to the point where an uncompensated impurity concentration of the order of $10^{12}$ uncompensated activator impurities per cubic centimeter is readily obtainable. Such purities may readily be obtained, and are commercially available, by the process of multiple pass zone refining, for example. Such purity is more than adequate for most semiconductor device preparation and heretofore a need for higher-purity germanium has not arisen.

Recently, however, germanium has been of interest in the preparation of detectors for high-energy particles as, for example, gamma rays. In such applications, it is desirable to have a space-charge layer thickness of the order of one centimeter with a bias voltage of approximately 1,000 volts, requiring an impurity concentration of the order of $10^{10}$ uncompensated activator impurities per cubic centimeter thereof, or less. Such hyperpure germanium is neither available nor is it known how such purities could be obtainable, according to the prior art.

Accordingly, an object of the present invention is to provide hyperpure germanium having a concentration of uncompensated activator impurities thereof of the order of $10^{10}$ impurity activators per cubic centimeter thereof or less.

Still another object of the present invention is to reduce the concentration of boron in germanium in all of its forms to a concentration of less than $10^{10}$ atoms of boron per cubic centimeter thereof.

Briefly stated, in accord with the present invention, in one embodiment, I provide hyperpure germanium from which boron which may be associated with complex boron-oxygen compounds, and which may initially be present in the order of $10^{12}$ uncompensated atoms of boron per cubic centimeter therein, is removed by melting such germanium in a reaction chamber in which a substantial surface portion of the molten germanium is in contact with the ambient atmosphere and growing a crystalline ingot therefrom while the chamber is flushed with pure, dry nitrogen gas.

The novel features believed characteristic of the present invention are set forth in the appended claims. The invention itself, together with further objects and advantages thereof, may best be understood with reference to the following detailed description.

Since 1954, relatively high-purity germanium has been available. For example, samples have been prepared in this laboratory at that time having a net donor concentration of $1.1 \times 10^{12}$ per cubic centimeter, which is 25 times less than the intrinsic concentration at room temperature. Since the requirement of such high purity has heretofore been substantially nonexistent, there has been little or no incentive to reduce the impurity concentration further. Even today the best germanium that is commercially available is only about a factor of two times higher in purity than that which is mentioned above.

In 1963, germanium having apparent high purity was prepared by repeated float-zoning in a hydrogen atmosphere. This germanium, however, appeared to have electrical properties which were dominated by deep-level impurities of unknown origin making a clear evaluation of the impurity content impossible. Low-temperature Hall coefficient measurements of other germanium having the same order of impurities showed that the conductivity thereof was due to shallow level impurities which were indistinguishable from the familiar column 3 and 5 acceptors and donors. Studies of these crystals indicated that some source of uncontrolled contamination interfered with the purification, but that there was no theoretical reason why higher-purity germanium cuold not be purified. Recent work at this laboratory has shown that utilizing the best available starting material and the best available crucible, to prevent contamination thereby, still resulted in an uncompensated acceptor concentration of the order of $10^{12}$ uncompensated acceptors per cubic centimeter thereof.

In my work I became convinced that boron was the cause of this acceptor impurity. Since elemental boron is normally readily removable from germanium because it has a segregation coefficient of approximately 18, that is vastly and significantly greater than unity, normally one would not expect that boron would be a source of contamination at this level.

However, it was concluded that the boron present somehow combined with oxygen to form a complex boron-oxygen compound having a segregation coefficient of essentially unity in germanium, thus making it difficult to remove by fractional crystallization.

As used herein, "fractional crystallization" is generic to the well-known processes for preparation for high-purity semiconductor materials wherein a substantial surface of the molten germanium is in contact with ambient atmosphere. Thus, this term is intended to include the Czochralski seed crystal withdrawal method for growth of crystal and ingots described, for example, in Horn Patent 2,904,512, issued Sept. 15, 1959, the zone-refining techniques described, for example, in Pfann Patent 2,739,088, issued Mar. 20, 1956, and the special adaptation of zone-refining known as float zoning described, for example, in Hambach Patent 3,251,658, issued May 17, 1966, among others. It does not, however, include the Bridgeman technique and its close derivatives.

Utilizing my belief that the oxygen-boron complex was the reason for the difficult-to-remove acceptor impurities in the best highest-purity germanium I have been able to process, I grew a series of crystals from the same source material in various ambient gasses by fractional crystallization. In crystals grown in an atmosphere of helium and hydrogen, respectively, an uncompensated concentration of the order of $8 \times 10^{11}$ to $2 \times 10^{12}$ of acceptor atoms per cubic centimeter of germanium was present. This result was obtained by utilizing a Czochralski seed crystal withdrawal furnace having conventional structure and utilizing a high-purity quartz crucible with a charge of from 200 to 400 grams of germanium and growing a monocrystalline ingot of approximately 10 to 15 centimeters in length and approximately 2 centimeters in diameter. Crystal growth took approximately two hours, and the crystals were grown while revolving a seed crystal at a rate of approximately one revolution per second.

The same process was repeated a number of times in an atmosphere of pure, dry nitrogen in the hope that the nitrogen would react with the boron and eliminate it; although previous refining steps of growing germanium crystals in nitrogen had not shown any reduction in impurity content. Samples removed from the crystal so grown showed a remarkable improvement, often with as little as $5 \times 10^{10}$ uncompensated impurities per cubic centimeter thereof. This process was repeated numerous times with essentially the same results. To check the efficacy of fractional crystallization in nitrogen, the crystals so grown were again melted and regrown in helium and hydrogen, respectively, with the result that the acceptor-activator impurity concentration therein remained low or was even further decreased. Subsequent remelting and regrowth in any gas inert to germanium, such as the noble gases, preferably argon, produces the same results.

Typically, in practicing the growth of hyperpure germanium in accord with the present invention, a charge of 200 to 400 grams of high-purity germanium obtained from NPC Metals and Chemicals Company of Los Angeles, Calif., having an initial concentration of uncompensated donors of the order of $10^{12}$ per cubic centimeter is melted in a Spectrosil synthetic fused quartz crucible and brought to equilibrium at a temperature of 937° C. Other crucible materials may be used, such as carbon or quartz coated with pyrolytic graphite or silicon carbide. A seed crystal of germanium having the (1,0,0) plane parallel to the surface of the germanium melt is immersed therein and allowed to come into equilibrium therewith. Thereafter the crystal is rotated at a speed of approximately 0.1 to 4 revolutions per second, for example, and withdrawn at a rate of approximately one to 25 centimeters per hour, for example. A monocrystalline ingot having a length of approximately 12 centimeters and a diameter of approximately 2 centimeters, for example, was grown after two hours from beginning of the withdrawal of the seed crystal. The growth was accomplished by seed crystal withdrawal while nitrogen gas of high purity and dryness was passed through the growing chamber at a rate of approximately 100 cubic centimeters per minute. Nitrogen flow may conveniently be at any rate sufficient to prevent a leak back of any reactive atmosphere, as for example, oxygen or air into the system. The pressure of nitrogen may be any value sufficient to produce the boron removal. 10 torr is sufficient, although 1 atmosphere (760 torr) or higher is preferred. Nitrogen may be admixed with any gas inert to germanium, such as hydrogen, helium, or the noble gases such as argon. After the initial germanium was melted and when the nitrogen atmosphere was passed thereover, a white "fluff" appeared upon the surface of the germanium and, as the seed crystal was withdrawn, the "fluff" tended to collect in little balls of wooly-type consistency on the surface of the growing crystal. The amount of this "fluff" was exceedingly small and, to date, analysis thereof has not shown the presence of boron due to the minute quantity thereof and the lack of sensitivity of the analysis process. Nevertheless the "fluff" is believed to be a boron-containing silicon compound formed between the silicon, the boron, and the nitrogen. After the crystal was grown, a portion thereof was cut, rinsed, and tested, exhibiting a Hall coefficient of $4 \times 10^8$ cubic centimeters per coulomb and a resistivity at liquid nitrogen temperature of approximately 9,000 ohm centimeters, and indicating a purity of approximately $5 \times 10^{10}$ uncompensated donors per cubic centimeter thereof. The grown germanium was then returned to the crucible, melted in a flow of pure dry hydrogen, and regrown under the same circumstances as before, but with an atmosphere of pure dry hydrogen rather than nitrogen. After such growth, the crystal was again examined and found to have essentially the same purity.

In one specific example of preparation of hyperpure germanium in accord with the present invention, 200 grams of intrinsic-grade germanium from Hoboken Division of NPC Metals and Chemical Company of Los Angeles, Calif., further identified as LMC grade UMK germanium, in the form of zone-refined bars, approximately 2.5 square centimeters in area and 16 centimeters long, were etched with white etch (a mix of 4 parts concentrated nitric acid to 1 part hydrofloric acid by volume), rinsed in high-purity distilled water, and placed in a Spectrosil quartz crucible. Hydrogen has then flowed through the crystal growth chamber at a rate of approximately 100 cubic centimeters per minute while the crucible was heated to 950° C to melt the germanium. The hydrogen was then turned off and the temperature lowered to 937° C, while a supply of pure dry nitrogen, obtained from the "boil-off" of Linde liquid nitrogen having less than 5 p.p.m. of all impurities, was passed through the system at a rate of 100 cubic centimeters per minute. Once again, the thin film of white fluff formed on the molten surface of the germanium. A seed crystal having the (1,0,0) plane parallel with the surface of the melt was inserted into the melt and allowed to come to equilibrium therewith, and the seed crystal was withdrawn at a rate of approximately 10 centimeters per hour, and a rotation rate of one revolution per second. The crystal so drawn therefrom was approximately two centimeters in diameter and 12 centimeters long. During growth, the while fluff gradually collected on the surface of the grown crystal in the form of fluff balls. After growth, the grown crystal was cooled slowly for about one hour, removed, and etched in white etch for two minutes. When the crystal was cooled to 77° K. to measure the resistivity thereof by passing a DC current of one milliampere therethrough, a resistivity of 9,000 ohm centimeters was calculated. As before, the crystal was remelted and regrown in an atmosphere of hydrogen with no noticeable change in resistivity, thus indicating when compared with the previously set forth results of growing crystalline bodies of germanium from a high-purity source in a hydrogen atmosphere, that the growth in nitrogen is a key factor in the production of the hyperpure germanium having the aforementioned low acceptor-impurity concentration.

Such high-purity germanium crystals are of substantial utility in that they may be utilized to form wide space-charged regions in high-energy particle detectors because of the large depletion width or space-charged region which may be formed therein at substantial voltages.

I realize that germanium has been grown by fractional crystallization in atmospheres of nitrogen in the prior art. This is not, however, pertinent to the present invention. In those instances, nitrogen was utilized as a passive agent in that it did not react with germanium, and the prevailing impurity concentrations were large enough to mask any traces of boron that may have been present. One of the most significant aspects of my invention is my discovery, through experiment and analysis thereof, that when one reaches the level of the order of purity in germanium represented by less than $10^{12}$ atoms of uncompensated acceptors per cubic centimeter thereof, that the uncompensated acceptor residuum is boron and that the boron exists in association with a boron complex having a segregation coefficient of near unity. Having made this determination, I am then able to utilize pure, dry nitrogen as an active, rather than a passive, agent to remove the residual boron content from the purest available germanium of the prior art.

While the invention has been described herein with respect to certain embodiments and specific examples thereof, many modifications and changes will occur to those skilled in the art. Accordingly, I intend by the appended claims to cover all such modifications and changes as fall within the true spirit and scope of the present invention.

What I claim as new and desire to secure by Letters Patent of the United States is:

1. The method of producing hyperpure germanium which method comprises:
   (a) melting high-purity germanium having no greater than the order of $10^{12}$ uncompensated impurity atoms per cubic centimeter thereof in a crucible contained in a reaction chamber wherein a substantial surface of said molten germanium is in contact with ambient controllable atmosphere; and
   (b) growing a crystalline ingot from said molten germanium by fractional crystallization while flowing pure dry nitrogen through said chamber.

2. The method of claim 1 wherein said crystal is grown along the (1,0,0) direction.

3. The method of claim 1 where the Czochralski seed crystal withdrawal method of growth is used to grow said ingot.

4. The method of claim 1 where said nitrogen is passed through said reaction chamber at a pressure in excess of 10 torr.

5. The method of clam 1 and including the further step of etching and rinsing said crystal; remelting said crystal; and regrowing a crystalline ingot of hyperpure germanium by fractional crystallization while said reaction chamber is continually flushed with a pure dry gas which is inert with respect to germanium.

6. The method of removing boron from high-purity germanium in which uncompensated boron exists in a concentration of no greater than $10^{12}$ atoms thereof per cubic centimeter of germanium and is present in association with an oxygen complex having a segregation coefficient of essentially unity in germanium and including the steps of
   (a) melting said high-purity germanium in a crucible in a reaction chamber in which said molten germanium has a substantial surface portion thereof in contact with a controllable ambient atmosphere; and
   (b) growing a crystalline ingot of boron-free germanium from said molten germanium by fractional crystallization while said reaction chamber is flushed with a flow of pure dry nitrogen.

7. The method of claim 6 wherein said crystal is grown along the 1, 0, 0 direction.

8. The method of claim 6 where the Czochralski seed crystal withdrawal method of growth is used to grow said ingot.

9. The method of claim 6 wherein the zone melting method of crystal growth is used to grow said ingot.

10. The method of claim 6 wherein the float zoning method of crystal growth is used to grow said ingot.

11. The method of claim 6 where said nitrogen is passed through said reaction chamber at a rate of approximately 50 to 150 cubic centimeters per minute.

12. The method of claim 6 and including the further step of etching and rinsing said crystal; remelting said crystal; and regrowing a crystalline ingot of hyperpure germanium by fractional crystallization while said reaction chamber is continually flushed with a pure dry gas which is inert with respect to germanium.

References Cited
UNITED STATES PATENTS 3,442,622   5/1969   Monnier et al. _____ 148—1.6X L. DEWAYNE RUTLEDGE, Primary Examiner E. L. WEISE, Assistant Examiner